(12) United States Patent
Adkins et al.

(10) Patent No.: US 12,421,150 B2
(45) Date of Patent: Sep. 23, 2025

(54) METHOD FOR FORMING A GLASS ARTICLE

(71) Applicant: CORNING INCORPORATED, Corning, NY (US)

(72) Inventors: Laura Rose VanCott Adkins, Corning, NY (US); Gilbert De Angelis, Lindley, NY (US); Wade Leroy Harrington, Campbell, NY (US); Juan Camilo Isaza, Corning, NY (US); Pierre Rene Joseph Laronze, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 224 days.

(21) Appl. No.: 18/015,774

(22) PCT Filed: Aug. 3, 2021

(86) PCT No.: PCT/US2021/044260
§ 371 (c)(1),
(2) Date: Jan. 12, 2023

(87) PCT Pub. No.: WO2022/035637
PCT Pub. Date: Feb. 17, 2022

(65) Prior Publication Data
US 2023/0250006 A1  Aug. 10, 2023

Related U.S. Application Data

(60) Provisional application No. 63/064,642, filed on Aug. 12, 2020.

(51) Int. Cl.
*C03B 5/225* (2006.01)
*C03B 5/18* (2006.01)
*C03B 5/435* (2006.01)

(52) U.S. Cl.
CPC .............. *C03B 5/225* (2013.01); *C03B 5/18* (2013.01); *C03B 5/435* (2013.01)

(58) Field of Classification Search
None
See application file for complete search history.

(56) References Cited

U.S. PATENT DOCUMENTS 7,150,165 B2  12/2006  Pitbladdo
8,156,766 B2  4/2012  Pitbladdo
(Continued)

FOREIGN PATENT DOCUMENTS

AU  2003297512 A1  8/2004
CN  102432156 A  5/2012
(Continued)

OTHER PUBLICATIONS

CN 203625224 machine translation, Gekko et al., Apparatus for Producing Molten Glass Processing Device for Glass Substrate, Jun. 2014 (Year: 2014).*

(Continued)

*Primary Examiner* — Queenie S Dehghan
(74) *Attorney, Agent, or Firm* — Kevin M. Able; F. Brock Riggs

(57) ABSTRACT

A method of manufacturing a glass article includes flowing molten glass through a first vessel to a downstream second vessel, the molten glass flowing through a conduit connecting the first vessel to the second vessel, the first vessel and the conduit defining a continuous free volume above a free surface of the molten glass extending into at least a portion of the conduit. The method further includes venting a first atmosphere contained in the free volume to a second atmosphere external to the first vessel through a vent tube connected to the conduit proximate a top of the conduit and above the free surface, the vent tube extending downward (Continued)

from the conduit to a distal end of the vent tube along a longitudinal axis at an angle α relative to horizontal and providing fluid communication between the first atmosphere and the second atmosphere.

23 Claims, 6 Drawing Sheets

(56) References Cited

U.S. PATENT DOCUMENTS

| | | |
|---|---|---|
| 8,177,114 B2 | 5/2012 | Dorfeld et al. |
| 8,499,584 B2 | 8/2013 | Pitbladdo |
| 11,505,487 B2 | 11/2022 | Adkins et al. |
| 2004/0134235 A1 | 7/2004 | Pitbladdo |
| 2007/0084247 A1 | 4/2007 | Pitbladdo |
| 2008/0034798 A1 | 2/2008 | Bergman et al. |
| 2009/0038342 A1 | 2/2009 | Pitbladdo |
| 2012/0048459 A1 | 3/2012 | Dorfeld et al. |
| 2012/0073326 A1 | 3/2012 | Dorfeld et al. |
| 2022/0002179 A1 | 1/2022 | Adkins et al. |

FOREIGN PATENT DOCUMENTS

| | | | |
|---|---|---|---|
| CN | 103663927 A | 3/2014 | |
| CN | 104445868 A | 3/2015 | |
| CN | 107879597 A | 4/2018 | |
| JP | 2006-143549 A | 6/2006 | |
| JP | 2010-535694 A | 11/2010 | |
| JP | 2015-199639 A | 11/2015 | |
| JP | 2018-058756 A | 4/2018 | |
| KR | 10-1662469 B1 | 10/2016 | |
| WO | 2004/063102 A1 | 7/2004 | |
| WO | WO-2015057646 A1 * | 4/2015 | ............ C03B 5/225 |
| WO | WO-2018170392 A2 * | 9/2018 | ........... C03B 17/064 |
| WO | 2019/195636 A1 | 10/2019 | |
| WO | 2020/009143 A1 | 1/2020 | |
| WO | 2020/106539 A1 | 5/2020 | |
| WO | WO-2020112348 A1 * | 6/2020 | ............... C03B 5/16 |

OTHER PUBLICATIONS

International Search Report and Written Opinion of the International Searching Authority; PCT/US2021/044260; dated Nov. 24, 2021; 13 pages; Korean Patent Office.

Chinese Patent Application No. 202180055287.6, Office Action dated Mar. 8, 2025, 4 pages (English Translation only), Chinese Patent Office.

* cited by examiner

METHOD FOR FORMING A GLASS ARTICLE

CROSS-REFERENCE TO RELATED APPLICATIONS

This is a national stage application under 35 U.S.C. § 371 of International Application No. PCT/US2021/044260 filed on Aug. 3, 2021, which claims the benefit of priority under 35 U.S.C. § 119 of U.S. Provisional Application Ser. No. 63/064,642 filed on Aug. 12, 2020, the content of which is relied upon and incorporated herein by reference in their entireties.

FIELD

The present disclosure relates to a method for forming a glass article, and more particularly a method of venting a vessel holding or conveying molten glass during the article manufacture.

TECHNICAL BACKGROUND

Fining molten glass during a glass manufacturing process aids in removing dissolved gases from the molten glass, helping to yield a bubble-free glass product. The temperature of the molten glass is raised to a temperature greater than the melting temperature causing one or more fining agents in the molten glass to release oxygen. The oxygen combines with melting-related gases and bubbles of the resultant gas mixture rise a surface of the molten glass. The bubbles pop and the released gases fill a free volume of the fining vessel. These gases must be removed from the fining vessel. However, venting directly from the fining vessel through a top of the fining vessel risks condensate particles dropping from the vent tube into the molten glass below, either spontaneously or when the vent tube is cleaned to remove the condensate.

SUMMARY

In accordance with the present disclosure, a method of manufacturing a glass article is disclosed comprising flowing a molten material through a first vessel to a second vessel downstream from the first vessel, the molten material flowing through a conduit connecting the first vessel to the second vessel, the first vessel and the conduit defining a continuous free volume above a free surface of the molten material, the free volume extending into at least a portion of the conduit. The method further comprises venting a first atmosphere contained in the free volume to a second atmosphere external to the first vessel through a vent tube comprising a proximal end, a distal end opposite the proximal end, and a passage extending between the proximal end and the distal end, the proximal end connected to the conduit proximate a top of the conduit and above the free surface, the vent tube extending downward and away from the conduit along a longitudinal axis at an angle α relative to horizontal and providing fluid communication between the first atmosphere and the second atmosphere.

The vent tube can be straight, without bends or kinks, between the proximal end and the distal end. The proximal end is attached to the first vessel.

In various embodiments, the angle α is in a range from greater than 0° to less than 90°, for example in a range from about 3° to about 80°, from about 3° to about 40°, from about 3° to about 20°, or from about 3° to about 10°.

In some embodiments, the method may further comprise heating the vent tube during the venting. The heating can comprise establishing an electrical current in a heating element. The heating element can comprise a wall of the vent tube or be one or more individual discrete heating elements arranged adjacent to the vent tube wall.

When the vent tube wall is the heating element, the heating can comprise establishing an electrical current between a first electrical flange connected to the vent tube and a second electrical flange connected to at least one of the first vessel or the conduit.

In various embodiments, the first vessel can be a fining vessel.

In various embodiments, the second vessel can be a mixing vessel.

The method may further comprise flowing the molten material to a forming body and forming the molten material into a glass ribbon. In some embodiments, the forming can comprise drawing the molten material downward from the forming body.

In some embodiments, a first portion of the conduit can extend horizontally from the first vessel, and the vent tube can be connected to the first portion. In some embodiments, a second portion of the conduit extends downward relative to horizontal. The second portion can be located downstream from the first portion relative to the direction of flow of molten glass through the conduit. The second portion can be attached to the first portion. In some embodiments, the conduit may comprise a first section and a second section, wherein the first conduit portion and the second conduit portion comprise the first conduit section. The conduit may still further comprise a second section coupled to the first conduit section (e.g., the second conduit portion) by a glass seal.

The method may still further comprise flowing a cover gas into the free volume through a gas delivery pipe connected to the first vessel. The gas can comprise an inert gas. The gas can comprise oxygen. The gas can be a mixture of an inert gas and oxygen. The gas can be a humidified gas.

The method may further comprise heating the conduit while flowing the molten material through the conduit. In some embodiments, a thickness of a wall of the conduit varies along a length of the conduit. To wit, in a cross-section of the conduit orthogonal to a longitudinal axis of the conduit, a thickness of the wall of the conduit in a first portion of the cross-section is different than a thickness of the wall of the conduit in a second portion of the cross-section. In some embodiments, a circumferential thickness of the wall of the conduit can vary along a length of the conduit. In some embodiments, the thickness may vary both as a function of circumference and length. In other embodiments, a method of manufacturing a glass article is described, comprising flowing a molten material from a first vessel through a conduit connected to the first vessel, the first vessel and the conduit defining a continuous free volume above a free surface of the molten material, the free volume extending into a portion of the conduit.

The method may further comprise venting a first atmosphere contained in the free volume to a second atmosphere external to the first vessel through a vent tube comprising a proximal end and a distal end opposite the proximal end, the proximal end connected to the conduit proximate a top of the conduit and above the free surface, the vent tube extending downward along a longitudinal axis at an angle α relative to horizontal and providing fluid communication between the first atmosphere and the second atmosphere.

The method may still further comprise heating the vent tube while the flowing the molten material, the heating removing condensate accumulated on an interior surface of the vent tube. The heating can comprise establishing an electrical current in a heating element, for example in a wall of the vent tube wherein the vent tube is the heating element. For example, the heating may comprise establishing an electrical current between a first electrical flange connected to the vent tube and a second electrical flange connected to at least one of the first vessel or the conduit The method may still further comprise flowing the molten material to a forming body, the forming body forming the molten material into the glass article. In some embodiments, the glass article can be a glass ribbon. The forming may comprise drawing the molten material downward from the forming body.

In some embodiments, the first vessel can be a fining vessel.

In some embodiments, the second vessel can be a mixing apparatus.

In some embodiments, at least a first portion of the conduit extends downward relative to horizontal. For example, in some embodiments, a first portion of the conduit extends horizontally from the first vessel and the vent tube is connected to the first portion of the conduit. In some embodiments, a second portion of the conduit extends downward from the first portion of the conduit.

In some embodiments, the conduit may comprise a first section and a second section, wherein the first section is coupled to the second section by a glass seal.

In some embodiments, the method may further comprise flowing a gas into the free volume through a gas delivery pipe. The gas delivery pipe may be connected to the first vessel. In some embodiments, the cover gas may comprise an inert gas, for example nitrogen. The cover gas may be a low-oxygen gas comprising less than about 1.5% by volume oxygen $O_2$, for example, in a range from about 0.075% by volume to about 1.5% by volume In some embodiments, the cover gas may be a humidified gas. In some embodiments the cover gas may be a dry gas.

Additional features and advantages of the embodiments disclosed herein will be set forth in the detailed description that follows, and in part will be clear to those skilled in the art from that description or recognized by practicing the embodiments described herein, including the detailed description which follows, the claims, as well as the appended drawings.

It is to be understood that both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof.

DETAILED DESCRIPTION

Figure 1:
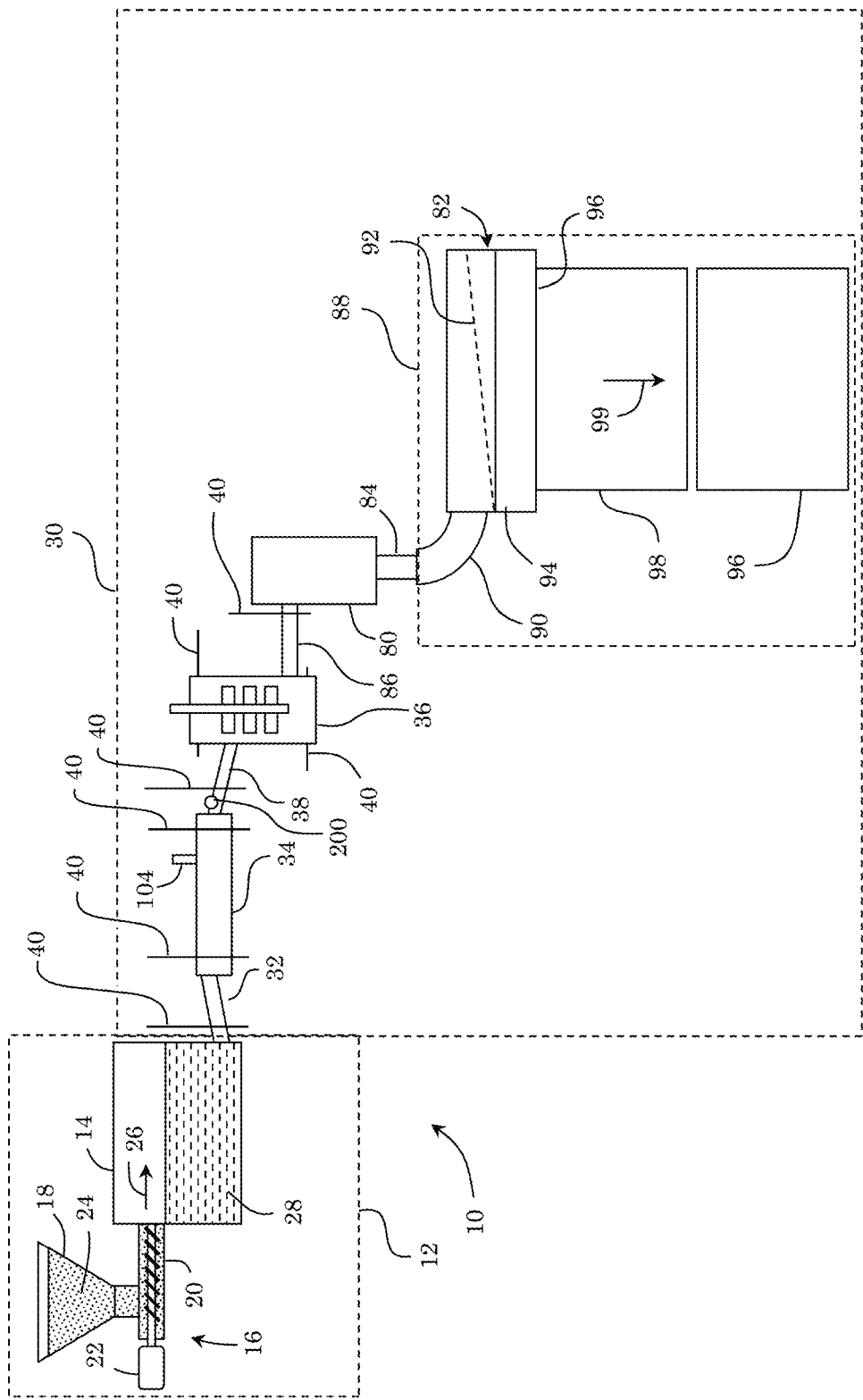
FIG. 1 is a schematic view of an exemplary glass making apparatus.

Reference will now be made in detail to embodiments of the present disclosure, examples of which are illustrated in the accompanying drawings. Whenever possible, the same reference numerals will be used throughout the drawings to refer to the same or like parts. However, this disclosure can be embodied in many different forms and should not be construed as limited to the embodiments set forth herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Ranges can be expressed herein as from "about" one particular value, and/or to "about" another particular value. When such a range is expressed, another embodiment includes from the one particular value to the other particular value. Similarly, when values are expressed as approximations by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred in any respect. This holds for any possible non-express basis for interpretation, including matters of logic with respect to arrangement of steps, operational flow, order of components, or orientation of components; plain meaning derived from grammatical organization or punctuation; and; the number or type of embodiments described in the specification.

As used herein, the singular forms "a," "an" and "the" include plural references unless the context clearly dictates otherwise. Thus, for example, reference to "a" component includes aspects having two or more such components, unless the context clearly indicates otherwise.

The word "exemplary," "example," or various forms thereof are used herein to mean serving as an example, instance, or illustration. Any aspect or design described herein as "exemplary" or as an "example" should not be construed as preferred or advantageous over other aspects or designs. Furthermore, examples are provided solely for purposes of clarity and understanding and are not meant to limit or restrict the disclosed subject matter or relevant portions of this disclosure in any manner.

As used herein, the terms "comprising" and "including", and variations thereof, shall be construed as synonymous and open-ended, unless otherwise indicated. A list of elements following the transitional phrases comprising or including is a non-exclusive list, such that elements in addition to those specifically recited in the list may also be present.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the term "electrically connected," "electrically connecting," and variations thereof, mean connected by way of an electrical conductor not including a molten material (e.g., molten glass). A first element electrically connected to a second element can include additional elements between the first element and the second element such that the additional elements are also electrically connected to the first element and the second element. That is, a first element electrically connected to a second element is not to be construed as precluding the presence of additional conducting elements in the connection. Typically, such electrical conductors can comprise metallic wiring or cabling, bus bars, and the like, but are not limited thereto. The electrical connection may further include other components, including but not limited to electrical connectors (e.g., plugs, tabs, lugs, bolts, etc.) that facilitate connection between components, electrical control devices such as electrical current and/or voltage controllers, electrical current and/or voltage measurement devices, and the like.

As used herein, "refractory" refers to non-metallic materials having chemical and physical properties making them applicable for structures, or as components of systems, that are exposed to environments above 538° C.

Shown in FIG. 1 is an exemplary glass manufacturing apparatus 10. In some embodiments, the glass manufacturing apparatus 10 can comprise a glass melting furnace 12 including a melting vessel 14. In addition to melting vessel 14, glass melting furnace 12 can optionally include one or more additional components such as heating elements (e.g., combustion burners and/or electrodes) configured to heat raw material and convert the raw material into molten glass. For example, melting vessel 14 may be an electrically boosted melting vessel, wherein energy is added to the raw material through both combustion burners and by direct heating, wherein an electrical current is passed through the raw material, the electrical current thereby adding energy via Joule heating of the raw material.

In further embodiments, glass melting furnace 12 can include other thermal management devices (e.g., isolation components) that reduce heat loss from the melting vessel. In still further embodiments, glass melting furnace 12 can include electronic and/or electromechanical devices that facilitate melting of the raw material into a glass melt. Glass melting furnace 12 can include support structures (e.g., support chassis, support member, etc.) or other components.

Melting vessel 14 can be formed from a refractory material, such as a refractory ceramic material, for example a refractory ceramic material comprising alumina or zirconia, although the refractory ceramic material can comprise other refractory materials, such as yttrium (e.g., yttria, yttria-stabilized zirconia, yttrium phosphate), zircon ($ZrSiO_4$) or alumina-zirconia-silica or even chrome oxide, used either alternatively or in any combination. In some examples, melting vessel 14 may be constructed from refractory ceramic bricks.

In some embodiments, glass melting furnace 12 can be incorporated as a component of a glass manufacturing apparatus configured to fabricate a glass article, for example a glass ribbon, although in further embodiments, the glass manufacturing apparatus can be configured to form other glass articles without limitation, such as glass rods, glass tubes, glass envelopes (for example, glass envelopes for lighting devices, e.g., light bulbs) and glass lenses, although many other glass articles are contemplated. In some examples, the melting furnace may be included in a glass manufacturing apparatus comprising a slot draw apparatus, a float bath apparatus, a down-draw apparatus (e.g., a fusion down draw apparatus), an up-draw apparatus, a pressing apparatus, a rolling apparatus, a tube drawing apparatus or any other glass manufacturing apparatus that would benefit from the present disclosure. By way of example, FIG. 1 schematically illustrates glass melting furnace 12 as a component of a fusion down-draw style glass manufacturing apparatus 10 for fusion drawing a glass ribbon for subsequent processing into individual glass sheets or for rolling the glass ribbon onto a spool. As used herein, fusion drawing comprises flowing molten glass over both side surfaces of a forming body, wherein the resulting two streams of molten material join, or "fuse," at the bottom of the forming body.

Glass melting furnace 12 can optionally include an upstream glass manufacturing apparatus 16 positioned upstream of melting vessel 14. In some examples, a portion of, or the entire upstream glass manufacturing apparatus 16, can be incorporated as part of the glass melting furnace 12.

As shown in the embodiment illustrated in FIG. 1, upstream glass manufacturing apparatus 16 can include a raw material storage bin 18, a raw material delivery device 20 and a motor 22 connected to raw material delivery device 20. Raw material storage bin 18 can be configured to store a quantity of raw material 24 that can be fed into melting vessel 14 of glass melting furnace 12 through one or more feed ports, as indicated by arrow 26. Raw material 24 typically comprises one or more glass forming metal oxides and one or more modifying agents. In some examples, raw material delivery device 20 can be powered by motor 22 to deliver a predetermined amount of raw material 24 from raw material storage bin 18 to melting vessel 14. In further examples, motor 22 can power raw material delivery device 20 to introduce raw material 24 at a controlled rate based on a level of molten material ((hereinafter "molten glass") sensed downstream from melting vessel 14 relative to a flow direction of the molten glass. As used herein, the term molten glass refers to any molten material ("melt"), which, when cooled, can become a glass or glass-ceramic (e.g., ceramic phase particles embedded in a glass phase matrix). Raw material 24 in melting vessel 14 can thereafter be heated to form molten glass 28. Typically, in an initial melting step, raw material is added to the melting vessel as particulate, for example as various "sands." Raw material 24 can also include scrap glass (i.e., cullet) from previous melting and/or forming operations. Combustion burners are typically used to begin the melting process. In an electrically boosted melting process, once the electrical resistance of the raw material is sufficiently reduced, electric boost can begin by developing an electrical potential between electrodes positioned in contact with the raw material, thereby establishing an electrical current through the raw material, the raw material typically entering, or in, a molten state.

Glass manufacturing apparatus 10 can also optionally include a downstream glass manufacturing apparatus 30 positioned downstream of glass melting furnace 12 relative to a flow direction of molten glass 28. In some examples, a portion of downstream glass manufacturing apparatus 30 may be incorporated as part of glass melting furnace 12. However, in some instances, first connecting conduit 32 discussed below, or other portions of the downstream glass manufacturing apparatus 30, can be incorporated as part of the glass melting furnace 12.

Downstream glass manufacturing apparatus 30 can include a first conditioning chamber, such as fining vessel 34, located downstream from melting vessel 14 and coupled to melting vessel 14 by way of the above-referenced first connecting conduit 32. In some examples, molten glass 28 may be gravity fed from melting vessel 14 to fining vessel 34 by first connecting conduit 32. For instance, gravity may drive molten glass 28 through an interior pathway of first connecting conduit 32 from melting vessel 14 to fining vessel 34. Accordingly, first connecting conduit 32 provides a flow path for molten glass 28 from melting vessel 14 to fining vessel 34. It should be understood, however, that other conditioning chambers may be positioned downstream of melting vessel 14, for example between melting vessel 14 and fining vessel 34. In some embodiments, a conditioning chamber can be employed between the melting vessel and the fining vessel. For example, molten glass from a primary melting vessel can be further heated in a secondary melting (conditioning) vessel or cooled in the secondary melting vessel to a temperature lower than the temperature of the molten glass in the primary melting vessel (melting vessel 14) before entering fining vessel 34.

As described previously, bubbles may be removed from molten glass 28 by various techniques. For example, raw material 24 may include multivalent compounds (i.e. fining agents) such as tin oxide that, when heated, undergo a chemical reduction reaction and release oxygen. Other suitable fining agents include without limitation, oxides of arsenic, antimony, iron, and cerium, although the use of arsenic and antimony oxides may be discouraged for environmental reasons in some applications as arsenic and antimony elements are biologically toxic. Fining vessel 34 is heated, for example to a temperature greater than the melting vessel temperature or the molten glass therein, thereby heating the fining agent. Oxygen produced by the temperature-induced chemical reduction of one or more fining agents included in the molten glass enters pre-existing bubbles in the molten glass, causing them to increase in size. The enlarged gas bubbles with increased buoyancy rise to a free surface of the molten glass within the fining vessel and are vented from the fining vessel as described in greater detail farther below.

The downstream glass manufacturing apparatus 30 can further include another conditioning chamber, such as mixing apparatus 36, for example a stirring vessel, for mixing the molten glass that flows downstream from fining vessel 34. Mixing apparatus 36 can be used to provide a homogenous molten glass composition, thereby reducing chemical or thermal inhomogeneities that may exist in the molten glass exiting the fining vessel. As shown, fining vessel 34 may be coupled to mixing apparatus 36 by way of a second connecting conduit 38. In some embodiments, molten glass 28 can be gravity fed from fining vessel 34 to mixing apparatus 36 by way of second connecting conduit 38. For instance, gravity may drive molten glass 28 through an interior pathway of second connecting conduit 38 from fining vessel 34 to mixing apparatus 36. Typically, the molten glass within mixing apparatus 36 includes a free surface, with a free volume extending between the free surface and a top of the mixing apparatus. As used herein, "free surface" refers to the interface between the molten glass and a gaseous atmosphere above the molten glass, i.e., the surface of the molten glass. While mixing apparatus 36 is shown downstream of fining vessel 34 relative to a flow direction of molten glass 28, mixing apparatus 36 may be positioned upstream from fining vessel 34 in other embodiments. In some embodiments, downstream glass manufacturing apparatus 30 may include multiple mixing apparatus, for example a mixing apparatus upstream from fining vessel 34 and a mixing apparatus downstream from fining vessel 34. These mixing apparatus may be of the same design, or they may be of a different design from one another. In some embodiments, one or more of the vessels and/or conduits comprising downstream glass manufacturing apparatus 30 can include static mixing vanes positioned therein to promote mixing and subsequent homogenization of the molten glass.

Heating of fining vessel 34, mixing apparatus 36, and other metallic components of the glass manufacturing apparatus, including but not limited to first connecting conduit 32, and second connecting conduit 38 can occur through direct heating. That is, electrical flange assemblies 40 may be attached to the various metallic components, wherein the flange assemblies 40 are in electrical communication with one or more electrical power sources configured to supply an electrical current to the electrical flange assemblies 40. The electrical current passes through walls of the metallic components (e.g., vessels, conduits) between the flange assemblies 40, thereby heating the walls of the metallic components by Joule heating, and subsequently heating the molten material 28 flowing therethrough. A more detailed discussion of the flange assemblies is provided farther below.

Figure 2:
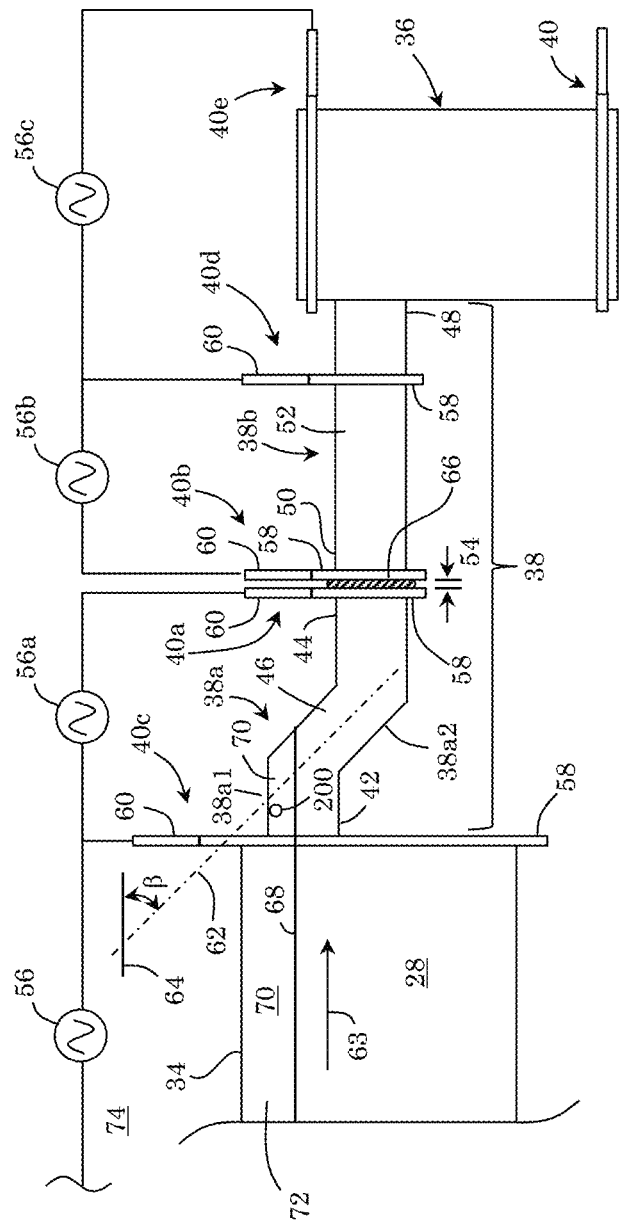
FIG. 2 is a schematic view of an exemplary connecting conduit extending between a fining vessel and a mixing apparatus.

In some embodiments, second connecting conduit 38 can include more than one section. For example, as shown in FIG. 2, second connecting conduit 38 can include a first conduit section 38a comprising a proximal end 42, a distal end 44 opposite proximal end 42, and a passage 46 extending between proximal and distal ends 42, 44. Proximal end 42 is connected to fining vessel 34. Second connecting conduit 38 may further include a second conduit section 38b comprising a proximal end 48, a distal end 50, and a passage 52 extending between proximal and distal ends 48, 50. Proximal end 48 may be connected to mixing apparatus 36

(e.g., a mixing vessel). First conduit section 38a can be rigidly joined to an exit of fining vessel 34 at proximal end 42 of first conduit section 38a by welding. Similarly, second conduit section 38b can be rigidly joined to an inlet of mixing apparatus 36 at proximal end 48 of second conduit section 38b by welding. Additionally, distal end 44 of first conduit section 38a can be coupled to distal end 50 of second conduit section 38b. For example, in various embodiments, first conduit section 38a may include a first electrical flange assembly 40a attached to distal end 44 and second conduit section 38b may include a second electrical flange assembly 40b attached to distal end 50, wherein first conduit section 38a and second conduit section 38b are arranged such that a gap 54 is formed between first electrical flange assembly 40a and second electrical flange assembly 40b. Gap 54 can be, for example, in a range from about 1 mm to about 1 cm. As molten glass 28 is conveyed through first and second conduit sections 38a, 38b, the molten glass can seep into gap 54. Exposure of the molten glass in the gap to the cooler environment outside the gap cools the molten glass therein, whereupon the viscosity of the molten glass increases, blocking the gap and preventing further leakage of molten glass. Such blockage is referred to as a "glass seal." The glass seal can accommodate small misalignment or movement of the coupled components, such as during temperature changes, and may electrically isolate first conduit section 38a from second conduit section 38b and allow independent direct heating.

First and second electrical flange assemblies 40a, 40b are configured to allow an electrical current to enter or leave the respective first or second conduit sections 38a, 38b. For example, in some embodiments, fining vessel 34 may include a third electrical flange assembly 40c positioned at or proximate to the junction between proximal end 42 of first conduit section 38a and fining vessel 34. Accordingly, first electrical flange assembly 40a and third electrical flange assembly 40c can be electrically connected to an electrical power source 56a capable of supplying an electrical current to first conduit section 38a through first and third electrical flange assemblies 40a and 40c. The supplied electrical current can thereby heat the first conduit section 38a as a function of the electrical resistance of the wall(s) of the first connecting conduit portion by direct heating. While first electrical power source 56a is shown in direct connection to electrical flange assemblies 40a and 40c, in further embodiments, first electrical power source 56a can be in indirect electrical connection. For example, first electrical power source 56a can comprise a transformer wherein one side of the transformer windings (e.g., primary winding) can be electrically connected to the electrical service for the facility housing the glass manufacturing apparatus, and the other side of the transformer windings (e.g., secondary winding) can be electrically connected to the first and third electrical flange assemblies 40a, 40c through winding taps. Electrical flange assemblies 40a-40c each include a body portion 58 that encircles and attaches to the respective conduit or vessel portion to which it is attached, and one or more electrode portions 60 that extend from the body portion and provide an attachment point for electrical power cables or bus bars that supply the electrical current to the flange assemblies. While not shown, in various embodiments, the electrical flange assemblies may include one or more rings (e.g., concentric rings) of different materials, different thicknesses, and/or different radial widths to control the distribution of electrical current around the flange assembly and into the respective conduit or vessel.

While fining vessel 34 is typically arranged such that its length is horizontal or substantially horizontal (e.g., within 10° of horizontal), as seen in FIG. 2, first conduit section 38a may include a first conduit portion 38a1 arranged horizontally or substantially horizontally, and a second conduit portion 38a2 that slopes downward from first conduit portion 38a1 (e.g., relative to horizontal) at an angle $\beta$ along a longitudinal axis 62 of the section. As described herein, axes that extend in a downward direction relative to horizontal and a local direction of molten glass flow (e.g., direction 63) will be considered to extend at a negative angle and axes that extend in an upward direction relative to horizontal and a local direction of molten glass flow (e.g., direction 63) will be considered to extend at a positive angle. Accordingly, longitudinal axis 62 may form a negative angle $\beta$ relative to horizontal axis 64. The downward slope of conduit portion 38a2 positions second conduit section 38b, coupled via glass seal 66 to first conduit section 38a, entirely below a plane defined by free surface 68 of molten glass 28 in fining vessel 34. To wit, in operation, molten glass 28 conveyed through fining vessel 34 is maintained at a level such that free surface 68 of the molten glass in fining vessel 34 forms a "free volume" 70 within the fining vessel defined between the free surface 68 of molten glass 28 and fining vessel 34. Free volume 70 is free of molten glass and contains a first atmosphere 72 that provides space for accumulation of volatile gases and other materials that may be released from the molten glass. For example, certain constituents of the molten glass, e.g., boron, can readily evaporate from the free surface of the molten glass. Additionally, various gases generated during the melting process may be released from the free surface. As described herein below, this first atmosphere can be vented to a second atmosphere 74 external to the fining vessel (e.g., an ambient atmosphere surrounding the glass making apparatus 10). Moreover, free volume 70 is continuous within at least a portion of first conduit section 38a (e.g., proximate fining vessel 34) and also includes first atmosphere 72. The level (vertical position) of free surface 68 of the molten material is referred to as the "glass line," which term may be used interchangeably with molten glass level herein. The glass line may be thought of as the level to which the molten glass wets the inside surface of the conduit inside wall surface.

Positioning second conduit section 38b below the glass line, and in particular below the minimum expected glass line, can minimize trapping of gases contained in first atmosphere 72 into the molten glass. Second conduit section 38b is positioned sufficiently below the glass line that normal excursions of the glass line up or down will not result in a free volume within second conduit section 38b.

As further shown in FIG. 2, additional flange assemblies may be provided. For example, a fourth electrical flange assembly 40d may be attached to second conduit section 38b downstream of second electrical flange assembly 40b, wherein second electrical flange assembly 40b and fourth electrical flange assembly 40d are electrically connected to a second electrical power source 56b. Electrical current supplied by second electrical power source 56b is passed through the wall of second conduit section 38b via second electrical flange assembly 40b and fourth electrical flange assembly 40d. Similarly, a fifth electrical flange assembly 40e may be attached to mixing apparatus 36 and electrically connected to a third electrical power source 56c, wherein electrical flange assemblies 40d and 40e supply an electrical current through portions of second conduit section 38b and mixing apparatus 36 via third electrical power source 56c. Other electrical flange assemblies 40 may be provided on mixing apparatus 36 and fining vessel 34. In some embodiments, a plurality of flange assemblies 40 and a plurality of electrical power sources 56 may be provided on fining vessel 34 and other components of the downstream glass manufacturing apparatus 30 and can define a plurality of individually controlled heating zones. Each heating zone may be provided with an electrical current of the same or differing electrical current magnitude and phase as necessary to obtain a predetermined temperature within the individual temperature zone. For example, in some embodiments, it may be desirable to cool the molten glass flowing through second connecting conduit 38 before entering mixing apparatus 36 Accordingly the electrical current in first conduit section 38*a* may be controlled to have a magnitude less than the magnitude of the current in second conduit section 38*b* such that a temperature of second conduit section 38*b* is cooler than a temperature of first conduit section 38*a*, thereby cooling the molten glass as the molten glass flows through first and second conduit sections 38*a* and 38*b*.

Returning to FIG. 1, downstream glass manufacturing apparatus 30 can further include another conditioning chamber such as delivery vessel 80 located downstream from mixing apparatus 36. Delivery vessel 80 can condition molten glass 28 to be fed into a downstream forming device. For instance, delivery vessel 80 can act as an accumulator and/or flow controller to adjust and provide a consistent flow of molten glass 28 to forming body 82 by way of exit conduit 84. The molten glass within delivery vessel 80 can, in some embodiments, include a free surface, wherein a free volume extends upward from the free surface to a top of the delivery vessel. As shown, mixing apparatus 36 can be coupled to delivery vessel 80 by way of third connecting conduit 86. In some examples, molten glass 28 can be gravity fed from mixing apparatus 36 to delivery vessel 80 by way of third connecting conduit 86. For instance, gravity can drive molten glass 28 through an interior pathway of third connecting conduit 86 from mixing apparatus 36 to delivery vessel 80.

Downstream glass manufacturing apparatus 30 can still further include forming apparatus 88 comprising the above-referenced forming body 82, including inlet conduit 90. Exit conduit 84 can be positioned to deliver molten glass 28 from delivery vessel 80 to inlet conduit 90 of forming apparatus 88. Forming body 82 in a fusion down-draw glass making apparatus can comprise a trough 92 positioned in an upper surface of the forming body, and converging forming surfaces 94 (only one surface shown) that converge in a draw direction along a bottom edge (root) 96 of the forming body wherein the converging surfaces define the root. Molten glass delivered to forming body trough 92 via delivery vessel 80, exit conduit 84 and inlet conduit 90 overflows the walls of forming body trough 92 and descends along the converging forming surfaces 94 as separate flows of molten glass. The separate flows of molten glass join below and along root 96 to produce a single ribbon 98 of molten glass that is drawn along a draw plane in a draw direction 100 from root 96 by applying a downward tension to the ribbon, such as by gravity and/or pulling roll assemblies (not shown), to control the dimensions of the ribbon as the molten glass cools and a viscosity of the molten glass increases. Accordingly, ribbon 98 goes through a viscoelastic transition to an elastic state and acquires mechanical properties that give ribbon 98 stable dimensional characteristics. The resultant glass ribbon 98 may in some embodiments be separated into individual glass sheets 102 by a glass separation apparatus (not shown), while in further embodiments, the glass ribbon may be wound onto spools and stored for further processing.

Components of downstream glass manufacturing apparatus 30, including any of connecting conduits 32, 38, 86, fining vessel 34, mixing apparatus 36, delivery vessel 80, exit conduit 84, or inlet conduit 90 may be formed from a precious metal. Suitable precious metals include platinum group metals selected from the group consisting of platinum, iridium, rhodium, osmium, ruthenium and palladium, or alloys thereof. For example, downstream components of the glass manufacturing apparatus may be formed from a platinum-rhodium alloy including from about 70% to about 90% by weight platinum and about 10% to about 30% by weight rhodium. However, other suitable metals for forming downstream components of the glass manufacturing apparatus can include molybdenum, rhenium, tantalum, titanium, tungsten and alloys thereof.

Although elements of the glass manufacturing apparatus 10 are shown and described as fusion downdraw glass making elements, principles of the present disclosure can be applied to a wide variety of glass making processes. For example, melting vessels according to embodiments of the present disclosure can be used in such diverse glass making processes as fusion processes, slot draw processes, rolling processes, pressing processes, float processes, tube drawing processes, and so forth.

As described above, bubbles are removed from the molten material in fining vessel 34. These bubbles include, without limitation, those formed from trapped gases within the granular pile of raw materials and/or cullet introduced to the melting system as those materials melt, bubbles generated, for example, from the chemical dissolution or reactions of the raw materials throughout the melting process, and bubbles generated from reactions with other materials in the process, such as refractory or metallic components. Bubbles may contain, for example, such gases as oxygen, nitrogen, water vapor, argon, sulfur dioxide, and carbon dioxide. Additionally, in various embodiments, gases may be intentionally introduced into the fining vessel (e.g., into free volume 70) through a gas supply pipe 104 to aid the fining process (see FIG. 3). Such deliberately introduced gases can include nitrogen, helium, or other inert gases or combinations thereof. Water may be introduced in the form of vapor and may be combined with the inert gases (e.g., humidified gas). Still further, the high temperatures present in parts of the fining vessel (approaching or exceeding 1700° C. in some instances) can cause vaporization of one or more constituents of the molten glass, e.g., boron, sodium, and/or tin.

In accordance with embodiments described herein, a cover gas 106 can be injected into free volume 70 above free surface 68 via fining vessel gas supply tube 104. In some embodiments, cover gas 106 can be a humidified cover gas. Humidified cover gas 106 comprises water vapor and oxygen ($O_2$) and can further comprise a non-combustible carrier gas. As used herein a non-combustible carrier gas does not include hydrocarbons and/or is not formed as a by-product of combustion during the glass making process, and may comprise, for example, an inert gas such as nitrogen, although in further embodiments, the carrier gas may be another inert gas, for example a noble gas such as helium, neon, argon, krypton, xenon, etc., or combinations of any of the preceding inert gases. For example, in embodiments, neither the carrier gas, nor any component of the humidified gas in general, originates from a submerged combustion burner in the glass making process (e.g., melting vessel) that relies on the combustion of a fuel, for example natural gas, as a source of humidity (e.g., water vapor).

The average oxygen ($O_2$) content of humidified cover gas 106 should be equal to or greater than the oxygen content in the bubbles to ensure no outward diffusion of oxygen from the bubbles. That is, the partial pressure of oxygen in the atmosphere outside the bubbles should at least be equal to the partial pressure of oxygen inside the bubbles. Outward diffusion of oxygen from the bubbles into the surrounding atmosphere can lead to bubble shrinkage and subsequent bubble wall thickness. Thickened bubble walls can prolong bubble popping for a time sufficient to allow the bubbles to become re-entrained within the molten glass flow. Thus, in some embodiments, the partial pressure of oxygen within the humidified gas can be greater than the partial pressure of oxygen in the bubbles to ensure bubble expansion.

The average oxygen content of oxygen in humidified cover gas 106 can, for example, be in a range from about 10% to about 90% by volume, for example in a range from about 15% to about 90% by volume, in a range from about 20% to about 90% by volume, in a range from about 30% to about 90% by volume, in a range from about 40% to about 90% by volume, in a range from about 50% to about 90% by volume, in a range from about 60% to about 90% by volume, in a range from about 70% to about 90% by volume, in a range from about 80% to about 90% by volume, in a range from about 10% to about 80% by volume, in a range from about 10% to about 70% by volume, in a range from about 10% by volume to about 60% by volume, in a range from about 10% by volume to about 50% by volume, in a range from about 10% by volume to about 40% by volume, in a range from about 10% by volume to about 30% by volume, or in a range from about 10% by volume to about 20% by volume, including all ranges and sub-ranges therebetween. In some embodiments, humidified cover gas 106 can comprise air.

In some embodiments, the presence of water vapor as a surfactant can counter the effect of a lower partial pressure of oxygen outside the bubble wall than inside the bubble wall. It should be understood, therefore, that a goal is to prevent bubble shrinkage, which can thicken the bubble wall and prolong bubble persistence (delay bubble popping). Accordingly, the amount of oxygen and water vapor can be adjusted to prevent bubble shrinkage, which, in some embodiments can result in a partial pressure of oxygen outside the bubble that is less than the partial pressure of oxygen inside the bubble.

A dew point of humidified cover gas 106 can be in a range from about 41° C. to about 92° C., for example in a range from about 60° C. to about 92° C. The remainder of the humidified cover gas can be the inert carrier gas.

A flow rate of humidified cover gas 106 can be in a range from greater than 0 to about 80 standard liters per minute (slpm), for example in a range from about 10 slpm to about 80 slpm, in a range from about 20 slpm to about 80 slpm, in a range from about 30 slpm to about 80 slpm, such as in a range from about 40 slpm to about 80 slpm, in a range from about 50 slpm to about 80 slpm, in a range from about 60 slpm to about 80 slpm, in a range from about 70 slpm to about 80 slpm, in a range from about 10 slpm to about 70 slpm, in a range from about 10 slpm to about 60 slpm, in a range from about 10 slpm to about 50 slpm, in a range from about 10 slpm to about 40 slpm, in a range from about 10 slpm to about 30 slpm, or in a range from about 10 slpm to about 20 slpm.

In some embodiments, fining vessel gas supply tube 104 may be heated, thereby heating the humidified cover gas supplied to fining vessel 34. For example, fining vessel gas supply tube 104 and thereby humidified cover gas 106 may be heated by one or more heating elements 107 such as external electrical resistance heating element(s) 108, although in further embodiments, fining vessel gas supply tube 104 may be direct heated by establishing an electric current directly within the fining vessel gas supply tube in a manner similar to the method of heating fining vessel 34. For example, fining vessel gas supply tube 104 may include one or more electrical flange assemblies 40 in electrical communication with an electrical power source as described in respect of fining vessel 34.

In accordance with other embodiments described herein, a dry cover gas 106 can be injected into free volume 70 above free surface 68 via fining vessel gas supply tube 104. Dry cover gas 106 can, in various embodiments, comprise a relative humidity equal to or less than about 1%, for example equal to or less than about 0.5%, equal to or less than about 0.1%, or equal to or less than about 0.05%, such as zero percent (0%), and can further comprise inert gas, for example nitrogen, although in further embodiments, the inert gas may be a noble gas such as helium, neon, argon, krypton, xenon, etc., or combinations of any of the preceding inert gases.

The average oxygen ($O_2$) content of dry cover gas 106 supplied to fining vessel 34 should be less than the oxygen content in the bubbles to ensure outward diffusion of oxygen from the bubbles. That is, the partial pressure of oxygen in the cover gas outside the bubbles should be less than the partial pressure of oxygen within the bubbles. For example, in various embodiments, dry cover gas 106 supplied to fining vessel 34 may comprise an $O_2$ content equal to or less than 0.2% by volume, for example in a range from about 0.05 by volume to about 0.2% by volume, such as in a range from about 0.075% by volume to about 1.5% by volume. There should be sufficient oxygen in the cover gas to prevent reduction of the platinum-comprising walls of the fining vessel due to a high nitrogen concentration in the cover gas. However, the concentration of oxygen should be sufficiently low to prevent damaging oxidation of the platinum-comprising walls at high temperatures. Accordingly, in various embodiments, dry cover gas 106 can be a majority nitrogen gas (>50% by volume) comprising oxygen in a range from about 0.05% by volume to about 0.2% by volume and comprising a relative humidity equal to or less than about 0.5%. In other embodiments, dry cover gas 106 can be a majority nitrogen gas comprising oxygen in a range from about 0.075% by volume to about 0.15% by volume and comprising a relative humidity equal to or less than about 0.1%. In still other embodiments, dry cover gas 106 can be a majority nitrogen gas comprising oxygen in a range from about 0.075% by volume to about 0.15% by volume and comprising a relative humidity equal to or less than about 0.05%. In some embodiments, dry cover gas 106 may comprise $N_2$ in a concentration equal to or greater than 78% by volume, for example equal to or greater than about 85% by volume, equal to or greater than about 90% by volume, equal to or greater than about 95% by volume, equal to or greater than about 98% by volume, or equal to or greater than about 99.8% by volume.

The low oxygen, low humidity atmosphere provided to free volume 70 via dry cover gas 106 can produce a net flow of gas and/or vapor from inside bubbles on the surface of molten glass 28 within fining vessel 34 across the bubble membrane into free volume 70, where, as previously stated, the released gas and/or vapor (e.g., water vapor) can exit free volume 70 through a vent. The release of gas and/or vapor that diffuses from the bubbles across the bubble membranes can result in shrinkage of the bubbles. Shrinkage may make the bubbles too small to be re-entrained into the flow of molten glass, allowing the bubbles more time to pop. In some embodiments, such shrinkage can result in complete collapse of the bubbles.

A flow rate of cover gas 106 can be in a range from equal to or greater than about 1 (one) turnover per minute to equal to or less than about 1 turnover per hour, including all ranges and subranges therebetween. As used herein, "turnover" means a flow rate equivalent to the volume of the free volume per unit time. As an example, for a one-liter volume, one turnover per minute means a gas flow rate equal to one liter meter per minute. A gas supplied to a four-liter volume at a rate of two turnovers per minute means a flow rate of eight liters per minute. The flow rate selected will depend on the size of the free volume supplied with the cover gas. The flow rate of cover gas can be, for example, in a range from about 0.02 turnovers per minute to about 1 turnover per minute, in a range from about 0.05 turnovers per minute to about 1 turnover per minute, in a range from about 0.1 turnovers per minute to about 1 turnover per minute, in a range from about 0.5 turnovers per minute to about 1 turnover per minute, or in a range from about 0.8 turnovers per minute to about 1 turnover per minute, and including all ranges and subranges therebetween.

In some embodiments, a non-reactive gas, for example a noble gas such as argon, krypton, neon, or xenon, or another non-reactive gas, can be added to cover gas 106 at a predetermined concentration, for example a cover gas injected into the free volume in the finer or other vessel (e.g., mixing apparatus 36), as an aid to identifying a source of blisters in a finished glass article resulting from the glass manufacturing process. That is, bubbles in the molten glass can be tagged with a detectable quantity of a non-reactive gas as a means of determining a location for the bubble formation. For example, a specific first non-reactive gas (hereinafter "tag" gas) can be added to cover gas 106 supplied to fining vessel 34, for example a gas mixing chamber in fluid communication with the respective vessel gas supply tube (e.g., fining vessel gas supply tube 104). Suitable tag gases can include, but are not limited to, argon, krypton, neon, helium, and xenon.

Blisters (bubbles) found in a finished glass article can be analyzed, for example by mass spectrometry, to determine if the first tag gas is present in the blisters at a concentration consistent with the concentration of the first tag gas added to the cover gas supplied to fining vessel 34, thereby identifying the source of blisters as the fining vessel. However, a tag gas concentration found in blisters inconsistent with the concentration of the tag gas supplied to fining vessel 34 may indicate the source of the blisters is not the fining vessel. Similarly, a second tag gas different from the first tag gas can be added to a cover gas supplied to a different vessel, for example mixing apparatus 36. An analysis of blisters in the glass article can then be used to determine the number of blisters containing the first tag gas, if any, and/or the number of blisters containing the second tag gas, if any, thereby providing better identification and quantification of the source of blisters. If, for example the second tag gas is found, but not the first tag gas, then the source of blisters may be inferred to come from the vessel into which the second tag gas was injected. The presence of both the first tag gas and the second tag gas in a bubble may indicate the bubble survived transportation between several vessels and reside on the surface of the molten glass in both vessels.

The tag gas or gases are typically not the majority gas comprising the cover gas. For example, if the majority gas (>50%) comprising cover gas 106 is $N_2$, the cover gas may comprise less than 50% tag gas, wherein the tag gas is different than the majority gas.

Figure 3:
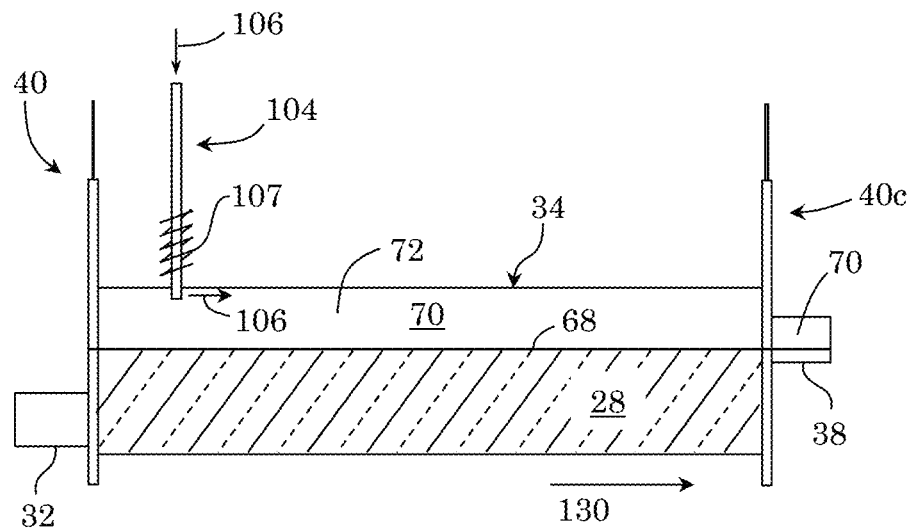
FIG. 3 is a side cross-sectional view of an exemplary fining vessel illustrating a gas delivery tube configured to provide a cover gas to a free volume of the fining vessel.
Figure 4:
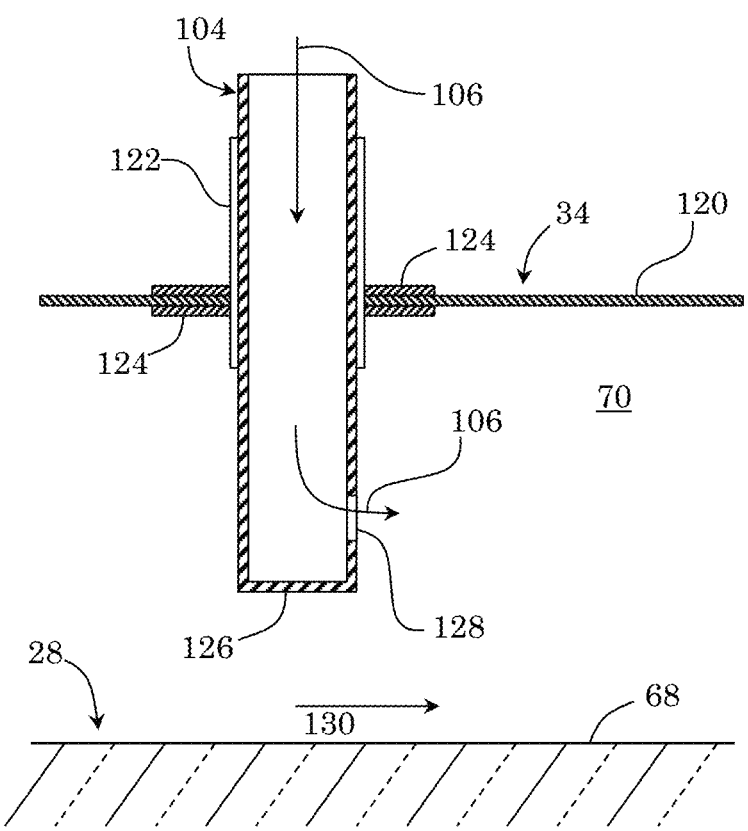
FIG. 4 is a detailed cross-sectional view of a portion of an exemplary gas delivery tube.

FIGS. 3 and 4 depict a lower portion of an exemplary fining vessel gas supply tube 104, shown penetrating a wall 120 of fining vessel 34 above free surface 68 of molten glass 28 in FIG. 3 and in cross-section in FIG. 4. Fining vessel gas supply tube 104 can extend through a reinforcing sleeve 122 where the fining vessel gas supply tube 104 penetrates fining vessel wall 120. In addition, reinforcing plate or plates 124 are depicted in FIG. 4 encircling reinforcing sleeve 122 and located above and/or below fining vessel wall 120 and attached thereto. Reinforcing plates 124, reinforcing sleeve 122, and fining vessel wall 120 can be attached to each other, such as by welding. For example, reinforcing plates 124 can be welded to fining vessel wall 120 and to reinforcing sleeve 122. In addition, in embodiments, reinforcing sleeve 122 can be welded to fining vessel gas supply tube 104. Reinforcing plates 124 and reinforcing sleeve 122 provide additional thickness to the fining vessel wall and to fining vessel gas supply tube 104 where the fining vessel gas supply tube penetrates the fining vessel, since all can be formed of thin sheets of a platinum alloy and easily deformed as the metal expands during initial heating up of the system. The additional thickness can provide greater strength to the gas supply tube where the gas supply tube penetrates the fining vessel wall and may reduce heating at the region of penetration by reducing electrical current (decreasing electrical resistance) through the junction in instances where the gas supply tube is direct heated.

Fining vessel gas supply tube 104 can comprise a closed bottom 126 and an exhaust port 128 located on the side wall of the fining vessel gas supply tube 104 near the bottom of the fining vessel gas supply tube and oriented such that cover gas 106 is exhausted from the fining vessel gas supply tube 104 in a direction substantially parallel with a flow direction 130 of the molten glass in fining vessel 34 (e.g., oriented in a downstream direction). Substantially parallel flow of cover gas 106 and molten glass 28 minimizes or eliminates direct impingement of the cover gas exhausted from the gas supply tube onto the surface of the molten glass and subsequent cooling of molten glass surface. Such cooling could cause viscosity inhomogeneities in the molten glass that could manifest as defects in the finished product. In addition, a side-ported fining vessel gas supply tube 104 can reduce the probability that condensates, such as glass constituents like easily volatilized boron, can accumulate in the exhaust port and eventually drop into the molten glass below.

As a consequence of the processes described above, first atmosphere 72 contained within free volume 70 and extending along a length of fining vessel 34 and at least a portion of first conduit section 38a can include any one or more of the preceding gases and vapors, and this atmosphere should be vented from the fining vessel. Typically, venting of fining vessel 34 has occurred through a vent tube extending from a top of the fining vessel. However, such a configuration can produce unwanted results. For example, volatile materials evaporating from the molten glass can condense on interior surfaces of the vent tube. If a sufficient amount of condensate accumulates, the condensate can break off and fall into the molten glass below, thereby contaminating the molten glass. Moreover, a straight vent tube extending from the top of the fining vessel is difficult to clean without dislodging condensate that, again, can fall through the vent tube and contaminate the molten glass below. Past efforts to mitigate contamination have included forming a bend in the vent pipe so the vent pipe, while initially rising vertically from the fining vessel, bends sharply so dislodged condensate will not fall into the fining vessel. However, such sharp bends make cleaning the vent pipe beyond the bend (e.g., between the bend and the fining vessel, difficult from outside the fining vessel, as cleaning tools are unable to reach from the vent tube exit to beyond the bend.

Figure 5:
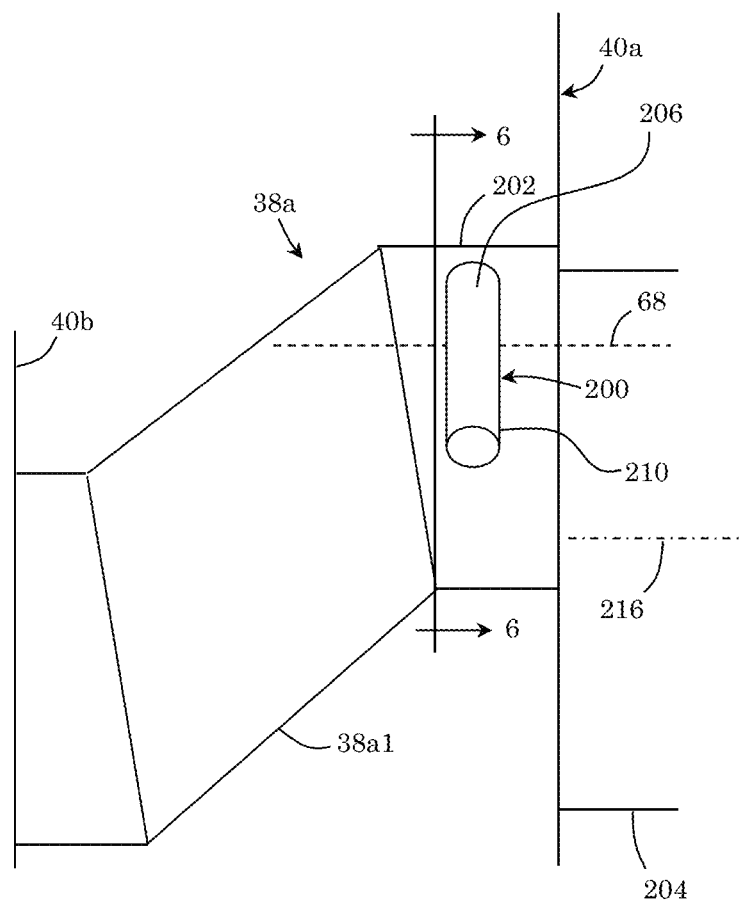
FIG. 5 is a portion of the exemplary connecting conduit of FIG. 2 illustrating a vent tube extending therefrom.
Figure 6:
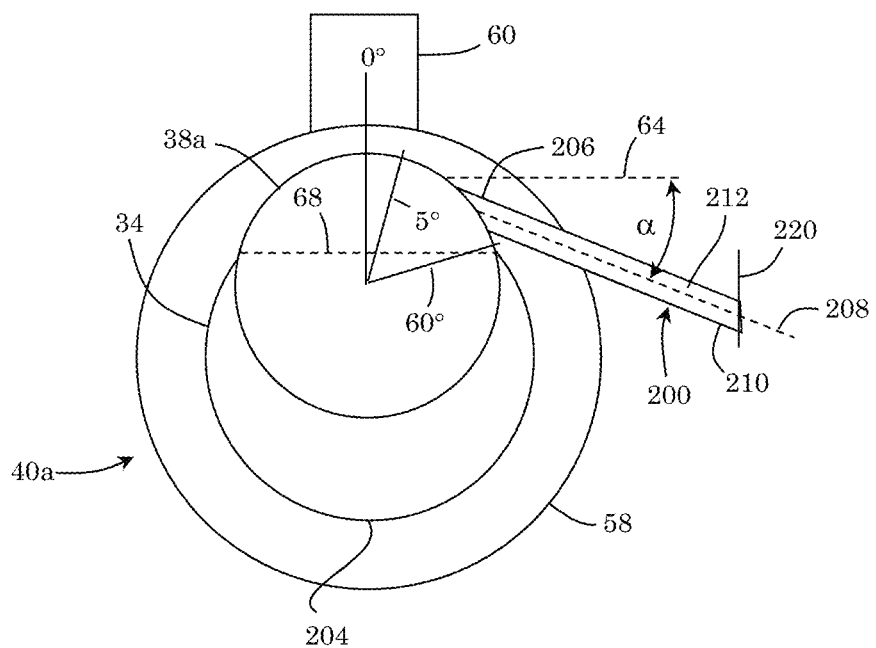
FIG. 6 is a view of the connecting conduit of FIG. 5 looking back along line 6-6 of FIG. 5

To overcome the preceding issues, embodiments of an improved venting apparatus are described. Accordingly, in some embodiments, a diameter of first conduit section 38a can be enlarged compared to conventional connecting conduits. Referring to FIGS. 5 and 6, a large-diameter conduit can provide an increased free volume 70, thereby enabling placement of vent tube 200 at a location proximate the top 202 of first conduit section 38a but sufficiently above the free surface of molten glass 28 to prevent ingress of molten glass 28 into vent tube 200. For example, the inlet of vent tube 200 may be positioned at least 2.5 cm above the glass line. Referring to the cross-sectional view of FIG. 6, shown looking along line 6-6 of FIG. 5, in various embodiments, the connection between vent tube 200 and first conduit section 38a can be positioned within an angular range from about 5° to about 60° relative to vertical, for example in a range from about 10° to about 45°, wherein a position of 0° refers to a connection at the vertical top of first conduit section 38a (i.e., 12 o'clock position).

In some embodiments, the top of first conduit section 38a can be higher than the top of fining vessel 34 relative to the bottom 204 of fining vessel 34. Vent tube 200 can be a straight vent tube extending from proximal end 206 downward along central longitudinal axis 208 at a negative angle α relative to horizontal and terminating at distal end 210, the vent tube defining a passage 212 therethrough (see FIG. 11). As shown, no portion of vent tube 200 extends upward from proximal end 206, either vertically or at any positive angle above horizontal. Angle α can be in a range from greater than 0° to less than 90°, such as in a range from about 3° to about 80°, from about 3° to about 40°, from about 3° to about 20°, or from about 3° to about 10°. Thus, vent tube 200 provides fluid communication between free volume 70 proximate the top of first conduit section 38a and further provides sufficient distance between free surface 68 of molten glass 28 and the bottom of proximal end 206 of vent tube 200 to accommodate upward excursions of the glass line without blocking the vent tube. First atmosphere 72 remains in fluid communication with the second, external atmosphere 74 through vent tube 200 during operation of the glass manufacturing apparatus. At the same time, vent tube 200 provides access through the entire length of the vent tube from outside second conduit 38 (e.g., first conduit section 38a), thereby facilitating easy cleanout without the risk of particulate dropping into molten glass 28.

Figure 7:
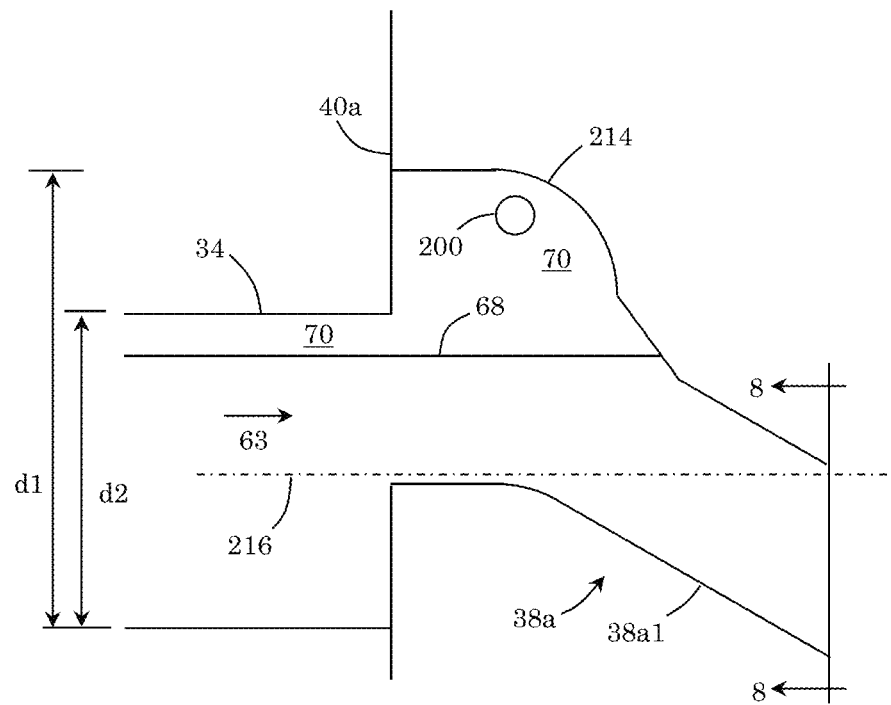
FIG. 7 is a cross-sectional side view of another embodiment of a connecting conduit with a domed portion proximate a fining vessel to which the connecting conduit is attached.

Referring to FIG. 7, in other embodiments, it may be unnecessary to enlarge the entirety of first conduit section 38a. Instead, a portion of first conduit section 38a can be enlarged upward, creating a large, domed portion 214 above free surface 68 of molten glass 28 within first conduit section 38a. Domed portion 214 can, in some embodiments, extend above fining vessel 34. That is, the top of domed portion 214 can extend vertically upward a greater distance d1 from the bottom of fining vessel 34 than the distance d2 of the top of fining vessel 34. As previously described, vent tube 200 can be a straight vent tube connected to domed portion 214 at proximal end 206 and extending from proximal end 206 downward along central longitudinal axis 208 at a negative angle α relative to horizontal, vent tube 200 terminating at distal end 210. As before, no portion of vent tube 200 extends upward from proximal end 206, either vertically or at any positive angle above horizontal. Angle α can be in a range from greater than 0° to less than 90°, such as in a range from about 3° to about 80°, from about 3° to about 40°, from about 3° to about 20°, or from about 3° to about 10°.

The large, upwardly extending domed portion 214 allows sufficient distance between free surface 68 of molten glass 28 and the bottom of proximal end 206 of vent tube 200 to accommodate upward excursions of the glass line during operation of the glass manufacturing apparatus. In other words, free volume 70 of fining vessel 34 extends into first conduit section 38a and the inlet of vent tube 200 is positioned on first conduit section 38a (e.g., domed portion 214) such that proximal end 206 of vent tube 200 is positioned above the expected maximum height of the glass line to prevent an upward excursion of the molten glass from blocking the vent tube during operation of the glass manufacturing apparatus. For example, the inlet of vent tube 200 may be positioned at least 2.5 cm above the glass line.

Although fining vessel 34 is shown having a circular cross-section in a plane orthogonal to central longitudinal axis 216 of the fining vessel, in further embodiments, fining vessel 34 may comprise a non-circular cross-sectional shape, for example an oblong cross-sectional shape. Similarly, vent tube 200 can have a non-circular cross-sectional shape.

Figures 8, 9:
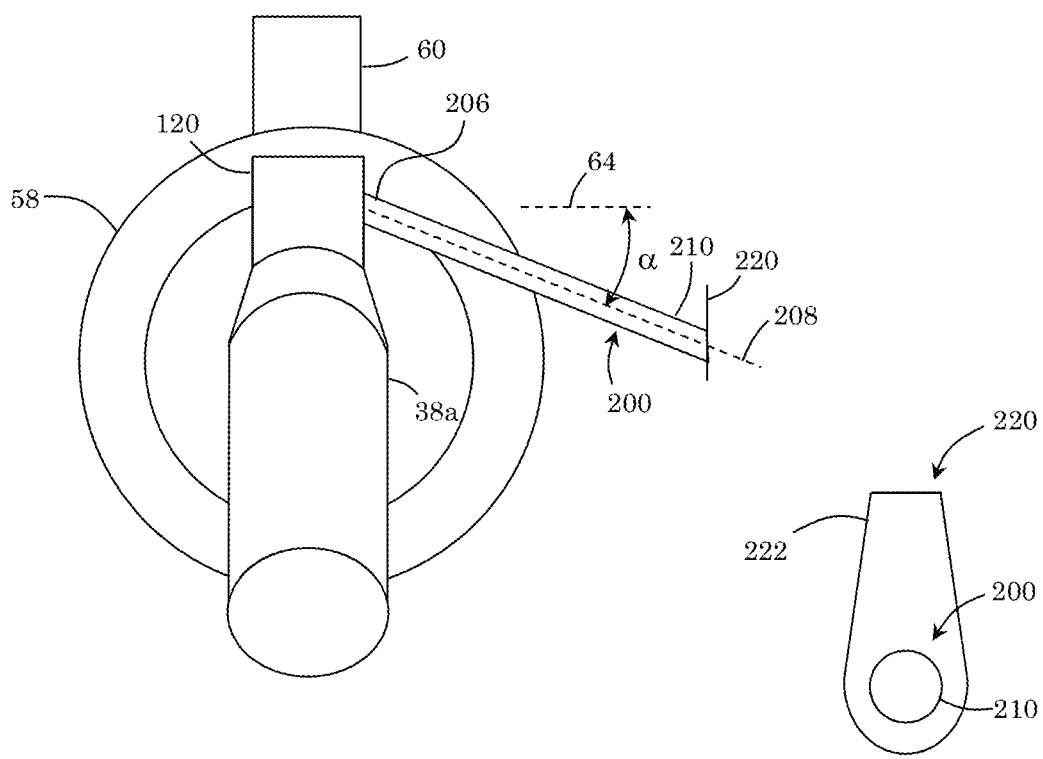
FIG. 8 is a view of the connecting conduit of FIG. 7 taken looking back along line 8-8 of FIG. 7 showing a vent tube extending from the domed portion.
FIG. 9 is a schematic view of an exemplary electrical flange located at a distal end of the vent tube shown in FIG. 6.
Figure 10:
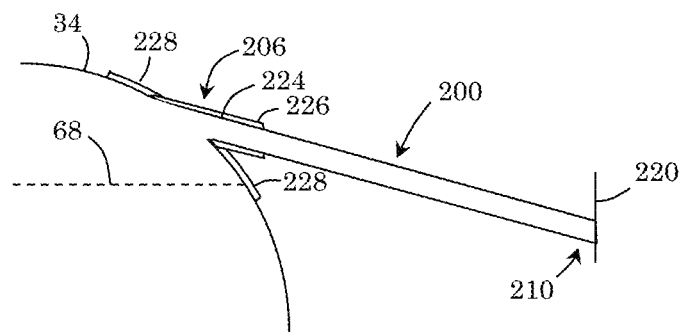
FIG. 10 is a schematic view of an embodiment of a vessel including a vent tube with a thickened end portion at the attachment point to the vessel.
Figure 11:
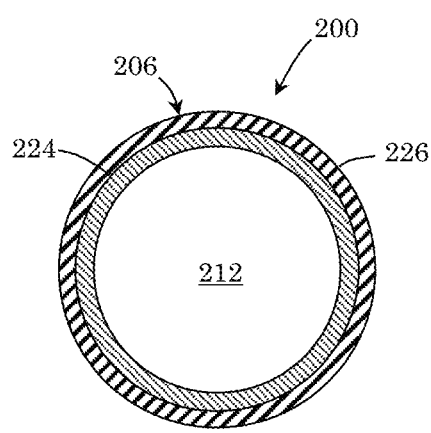
FIG. 11 is a cross-sectional view of the thickened portion of the vent tube.

In a manner similar to the arrangements shown in FIG. 6, seen looking back along line 6-6 of FIG. 5, in some embodiments, shown in FIG. 8 looking back along line 8-8 of FIG. 7, vent tube 200 can comprise an electrical flange 220. Electrical flange 220 is configured to extend completely around vent tube 200 at or near distal end 210 and may include an extended portion 222, e.g., an electrode portion, that functions as a connection point for an electrical cable, bus bar, or other electrical conductor. Electrical flange 220 may comprise a single, homogeneous piece and may comprise, for example a platinum-containing material, such as a platinum-rhodium alloy. In any of the preceding embodiments, vent tube 200 can be fitted with electrical flange 220 at distal end 210, wherein an electrical power supply can provide an electrical current between electrical flange 220 and either one or both of first electrical flange assembly 40a and/or third electrical flange assembly 40c. In some embodiments, the electrical power supply can comprise an additional secondary winding, or a tap from a single secondary winding, of first electrical power source 56a. Accordingly, vent tube 200 can be direct heated by an electrical current in a wall of the vent tube. To wit, the vent tube may serve as a heating element. As shown in FIGS. 10 and 11, in various embodiments, the wall of vent tube 200 at and/or near proximal end 206, where vent tube 200 attaches to first conduit section 38a, can be made thicker than the wall at distal end 118, or thicker than the vent tube wall at an intermediate position between proximal end 206 and distal end 210. For example, proximal end 206 may comprise multiple layers.

FIG. 11 illustrates an embodiment of proximal end 206 comprising a first, inner layer 224 and a second, outer layer 226. Inner layer 224 can be the vent tube itself that extends from proximal end 206 to distal end 210, wherein second layer 226 is a cladding layer disposed over the vent tube at proximal end 206. In such fabrication practices, second layer 226 can be attached to vent tube 200 by welding. A thick proximal end can strengthen the attachment region of vent tube 200 where the vent tube is attached to fining vessel 34 and can aid in controlling electrical current passing through the attachment point, thereby avoiding hot spots that may degrade the connection. Accordingly, in some embodiments the thickened portion of proximal end 206 may vary in thickness circumferentially as necessary to distribute the electrical current evenly around the circumference of the vent tube at proximal end 206. Similarly, a region of first conduit section 38a at the attachment of vent tube 200 may also be thickened relative to regions farther displaced from the vent tube, both to strengthen the connection point and to aid in distribution of the electrical current. The wall of connecting conduit 38 at the attachment point of vent tube 200 may also be thickened, such as by the attachment, for example by welding, of reinforcement plate(s) 228. In some embodiments, distal end 210 of vent tube 200 where electrical flange 220 is joined to the vent tube may be thickened in a manner similar to proximal end 206 by attaching sleeve around the vent tube at distal end 210.

In further embodiments, vent tube 200 can be heated by radiant and/or conductive heat from a separate heating element, e.g., a heating coil, positioned proximate the vent tube. For example, in some embodiments, a heating element can be coiled around but spaced apart from the vent tube. In some embodiments, a plurality of heating elements can be positioned at various locations around a circumference of vent tube 200. To maintain a temperature of the vent tube, vent tube 200 may be surrounded by, e.g., encased in, a thermal insulating material (not shown), for example a ceramic insulating material.

It will be apparent to those skilled in the art that various modifications and variations can be made to embodiments of the present disclosure without departing from the spirit and scope of the disclosure. Thus, it is intended that the present disclosure cover such modifications and variations provided they come within the scope of the appended claims and their equivalents.

What is claimed is:

1. A method of manufacturing a glass article, comprising:
   flowing a molten material through a first vessel to a second vessel downstream from the first vessel, the molten material flowing through a conduit connecting the first vessel to the second vessel, the first vessel and the conduit defining a continuous free volume above a free surface of the molten material, the free volume extending into at least a portion of the conduit; and
   venting a first atmosphere contained in the free volume to a second atmosphere external to the first vessel through a vent tube comprising a proximal end, a distal end opposite the proximal end, and a passage extending between the proximal end and the distal end, the proximal end connected to the conduit proximate a top of the conduit and above the free surface, the vent tube extending downward and away from the conduit along a longitudinal axis at an angle α relative to horizontal and providing fluid communication between the first atmosphere and the second atmosphere,
   wherein a first portion of the conduit extends horizontally from the first vessel and the vent tube is connected to the first portion of the conduit, and
   wherein at least a second portion of the conduit extends and slopes downward from the first portion of the conduit at an angle β relative to horizontal.

2. The method of claim 1, wherein the vent tube is straight between the proximal end and the distal end.

3. The method of claim 1, wherein the angle α is in a range from greater than 0° to less than 90°.

4. The method of claim 1, further comprising heating the vent tube during the venting.

5. The method of claim 4, wherein the heating comprises establishing an electrical current in a heating element.

6. The method of claim 5, wherein the heating element comprises a wall of the vent tube.

7. The method of claim 4, wherein the heating comprises establishing an electrical current between a first electrical flange connected to the vent tube and a second electrical flange connected to at least one of the first vessel or the conduit.

8. The method of claim 1, wherein the first vessel is a fining vessel.

9. The method of claim 8, wherein the second vessel is a mixing vessel.

10. The method of claim 1, further comprising, flowing the molten material to a forming body and forming the molten material into a glass ribbon.

11. The method of claim 1, further comprising flowing a cover gas into the free volume through a gas delivery pipe connected to the first vessel.

12. The method of claim 1, further comprising heating the conduit while flowing the molten material through the conduit.

13. The method of claim 1, wherein a thickness of a wall of the conduit varies along a length of the conduit.

14. The method of claim 1, wherein, in a cross-section of the conduit orthogonal to a longitudinal axis of the conduit, a thickness of a wall of the conduit in a first portion of the cross-section is different than a thickness of the wall of the conduit in a second portion of the cross-section.

15. A method of manufacturing a glass article, comprising:
    flowing a molten material from a first vessel through a conduit connected to the first vessel, the first vessel and the conduit defining a continuous free volume above a free surface of the molten material, the free volume extending into a portion of the conduit;
    venting a first atmosphere contained in the free volume to a second atmosphere external to the first vessel through a vent tube comprising a proximal end and a distal end opposite the proximal end, the proximal end connected to the conduit proximate a top of the conduit and above the free surface, the vent tube extending downward along a longitudinal axis at an angle α relative to horizontal and providing fluid communication between the first atmosphere and the second atmosphere; and
    heating the vent tube while flowing the molten material, the heating removing condensate accumulated on an interior surface of the vent tube,
        wherein at least a first portion of the conduit extends and slopes downward from the first vessel relative to horizontal, and
        wherein a second portion of the conduit extends horizontally from the first portion of the conduit.

16. The method of claim 15, wherein the heating comprises establishing an electrical current in a heating element.

17. The method of claim 16, wherein the heating element comprises a wall of the vent tube.

18. The method of claim 15, wherein the heating comprises establishing an electrical current between a first electrical flange connected to the vent tube and a second electrical flange connected to at least one of the first vessel or the conduit.

19. The method of claim 15, wherein the first vessel is a fining vessel.

20. The method of claim 19, wherein the second vessel is a mixing vessel.

21. The method of claim 15, further comprising flowing the molten material to a forming body and forming the molten material into a glass ribbon.

22. The method of claim 15, further comprising flowing a cover gas into the free volume through a gas delivery pipe.

23. The method of claim 22, wherein the gas delivery pipe is connected to the first vessel.

* * * * *